(12) United States Patent
Ren et al.

(10) Patent No.: US 11,362,548 B1
(45) Date of Patent: Jun. 14, 2022

(54) WIRELESS POWER SYSTEM CABLING

(71) Applicant: Apple Inc., Cupertino, CA (US)

(72) Inventors: Saining Ren, Auckland (NZ); Ho Fai Leung, Auckland (NZ); Liang Chen, Auckland (NZ)

(73) Assignee: Apple Inc., Cupertino, CA (US)

( * ) Notice: Subject to any disclaimer, the term of this patent is extended or adjusted under 35 U.S.C. 154(b) by 125 days.

(21) Appl. No.: 16/942,161

(22) Filed: Jul. 29, 2020

Related U.S. Application Data

(63) Continuation of application No. 16/503,194, filed on Jul. 3, 2019, now abandoned.

(60) Provisional application No. 62/840,274, filed on Apr. 29, 2019.

(51) Int. Cl.
| | |
|---|---|
| *H02J 7/00* | (2006.01) |
| *H02J 50/80* | (2016.01) |
| *H02J 50/12* | (2016.01) |
| *H04B 5/00* | (2006.01) |
| *H02J 50/10* | (2016.01) |
| *H02J 50/40* | (2016.01) |

(52) U.S. Cl.
CPC ............ *H02J 50/80* (2016.02); *H02J 7/0042* (2013.01); *H02J 50/10* (2016.02); *H02J 50/12* (2016.02); *H02J 50/402* (2020.01); *H04B 5/0037* (2013.01); *H04B 5/0075* (2013.01)

(58) Field of Classification Search
CPC ............ H02J 50/00–90; H04B 5/0037; H04B 5/0075
USPC .......................................... 320/108; 307/104
See application file for complete search history.

(56) References Cited

U.S. PATENT DOCUMENTS

| | | | |
|---|---|---|---|
| 9,018,900 B2 | 4/2015 | Yamamoto et al. | |
| 9,490,648 B2 | 11/2016 | Sookprasong et al. | |
| 9,929,584 B2 | 3/2018 | Aghassian et al. | |
| 2007/0182367 A1* | 8/2007 | Partovi ................... | H02J 50/70 320/108 |
| 2010/0084918 A1* | 4/2010 | Fells ........................ | G01V 3/10 307/32 |

\* cited by examiner

*Primary Examiner* — Zixuan Zhou
(74) *Attorney, Agent, or Firm* — Treyz Law Group, P.C.; G. Victor Treyz; Joseph F. Guihan

(57) ABSTRACT

A wireless power system has a wireless power transmitting device such as a charging puck and a wireless power receiving device such as a wristwatch. The charging puck may have a three-wire cable that is coupled between a connector and a puck housing. The wireless power transmitting device may have a set of four coils or other number of wireless power transmitting coils in the puck housing. A switch may be coupled in series with each of the four coils. Control circuitry in the wireless power transmitting device may activate a subset of the switches to switch a subset of the coils into use in transmitting the wireless power to the wireless power receiving device. The control circuitry may have a main portion in the connector that uses a tone-based encoding scheme or other encoding scheme to transmit switch configuration commands to a secondary portion in the puck housing.

19 Claims, 7 Drawing Sheets

US 11,362,548 B1

WIRELESS POWER SYSTEM CABLING

This application is a continuation of U.S. patent application Ser. No. 16/503,194, filed Jul. 3, 2019, which claims the benefit of U.S. provisional patent application No. 62/840,274, filed Apr. 29, 2019, which are hereby incorporated by reference herein in their entireties.

FIELD

This relates generally to power systems, and, more particularly, to wireless power systems for charging electronic devices.

BACKGROUND

In a wireless charging system, a wireless power transmitting device such as a charging mat or charging puck wirelessly transmits power to a wireless power receiving device such as a portable electronic device. The portable electronic device has a coil and rectifier circuitry. The coil of the portable electronic device receives alternating-current wireless power signals from the wireless power transmitting device. The rectifier circuitry converts the received signals into direct-current power.

SUMMARY

A wireless power system has a wireless power transmitting device and a wireless power receiving device. The wireless power receiving device may be a wristwatch having a magnetic core with at least first and second wireless power receiving coils. The wireless power transmitting device may have a connector such as a Universal Serial Bus connector that is coupled to a puck housing with a three-wire cable.

The wireless power transmitting device has a set of wireless power transmitting coils in the puck housing. There may be, for example, four wireless power transmitting coils. A switch may be coupled in series with each of the four coils. When it is desired to transmit power to the wireless power receiving device, the wireless power receiving device is coupled to the puck housing using magnets.

Impulse response measurement circuitry in the transmitting device can probe the wireless power transmitting coils to determine which coils are overlapped by the wireless power receiving coils and are appropriate to use in transmitting wireless power. Control circuitry in the wireless power transmitting device may then activate a subset of the coils for use in transmitting the wireless power to the wireless power receiving coils.

The control circuitry of the wireless power transmitting device may have a main portion in the connector that uses a tone-based encoding scheme or other encoding scheme to transmit switch configuration commands to a secondary portion in the puck housing. The secondary portion of the control circuitry receives the switch configuration commands and controls the switches that are coupled to the four coils accordingly. In this way, the control circuitry selects a desired pair of the four coils to use in transmitting the wireless power signals to the overlapping wireless power receiving coils in the wireless power receiving device.

Alternating-current drive signals may be supplied to the selected pair of wireless power transmitting coils using switching circuitry in the connector that is controlled by the main portion of the control circuitry.

DETAILED DESCRIPTION

A wireless power system includes a wireless power transmitting device such as a wireless charging puck. The wireless power transmitting device wirelessly transmits power to a wireless power receiving device such as a wristwatch or other electronic equipment. The wireless power receiving device uses power from the wireless power transmitting device for powering the device and for charging an internal battery.

The wireless power transmitting device interacts with the wireless power receiving device and obtains information on the characteristics of the wireless power receiving device. In some embodiments, the wireless power transmitting device has multiple power transmitting coils. In such embodiments, the wireless power transmitting device uses information from the wireless power receiving device and/or measurements made in the wireless power transmitting device to determine which coil or coils in the transmitting device are magnetically coupled to wireless power receiving devices. Coil selection is then performed in the wireless power transmitting device. Wireless power is transmitted from the wireless power transmitting device to the wireless power receiving device using selected coil(s) to charge a battery in the wireless power receiving device and/or to power other load circuitry.

The wireless power transmitting device has a cable with one end coupled to a connector such as a Universal Serial Bus (USB) connector for receiving power and another end coupled to a puck housing containing wireless power transmitting coils. The wireless power transmitting device has control circuitry that activates switches to select which coils in the puck housing are used to transmit wireless power to the wireless power receiving device, thereby helping to enhance wireless power transfer efficiency. The cable connector has a connector housing (e.g., a connector boot). The control circuitry may include a main controller (e.g., a main or a first control circuitry portion) in the connector (e.g., in the connector housing) and may include a secondary controller (e.g., an additional or a second control circuitry portion) in the puck housing.

The cable coupling the connector housing and puck housing may be a three-wire cable (e.g., a cable having more than two wires and fewer than four wires and having fewer wires than the number of coils in the puck housing). The main controller and secondary controller can communicate over a pair of the wires in the three-wire cable. Power harvesting circuitry may be provided in the puck housing. During initial measurement operations in which the main controller issues impulses to the coils, the power harvesting circuitry converts power from the impulses into direct-current (DC) power for powering the secondary controller.

Figure 1:
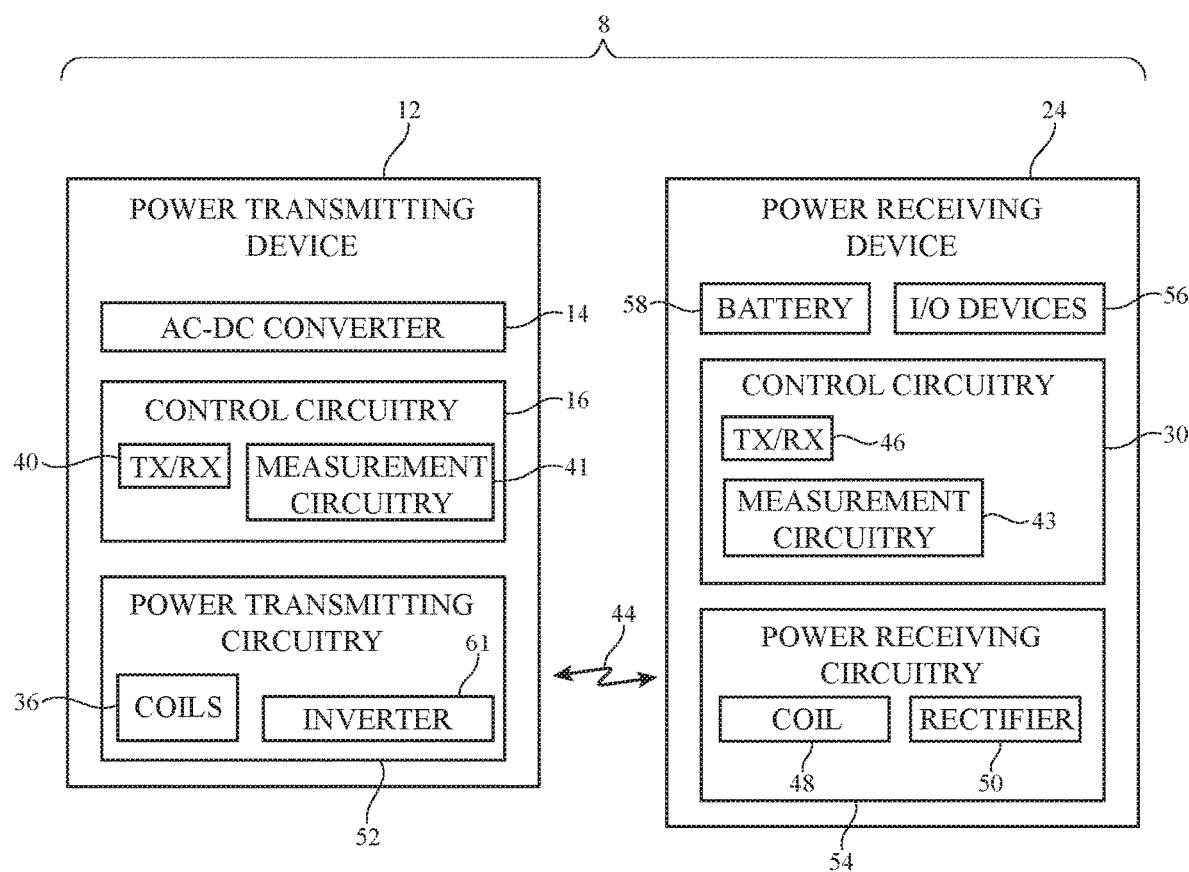
FIG. 1 is a schematic diagram of an illustrative wireless charging system that includes a wireless power transmitting device and a wireless power receiving device in accordance with an embodiment.

An illustrative wireless power system (wireless charging system) is shown in FIG. 1. As shown in FIG. 1, wireless power system 8 includes a wireless power transmitting device such as wireless power transmitting device 12 and includes a wireless power receiving device such as wireless power receiving device 24. Wireless power transmitting device 12 includes control circuitry 16. Wireless power receiving device 24 includes control circuitry 30. Control circuitry in system 8 such as control circuitry 16 and control circuitry 30 is used in controlling the operation of system 8. This control circuitry may include processing circuitry associated with microprocessors, power management units, baseband processors, digital signal processors, microcontrollers, and/or application-specific integrated circuits with processing circuits. The processing circuitry implements desired control and communications features in devices 12 and 24. For example, the processing circuitry may be used in selecting coils, determining power transmission levels, processing sensor data and other data, processing user input, handling negotiations between devices 12 and 24, sending and receiving in-band and out-of-band data, making measurements, and otherwise controlling the operation of system 8.

Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16 and/or 30. The processing circuitry may include application-specific integrated circuits with processing circuitry, one or more microprocessors, a central processing unit (CPU) or other processing circuitry.

Power transmitting device 12 may be a stand-alone power adapter (e.g., a wireless power transmitting device that includes power adapter circuitry), may be a wireless charging puck or other device that is coupled to a power adapter or other equipment by a cable, may be a portable device, may be equipment that has been incorporated into furniture, a vehicle, or other system, may be a removable battery case, or may be other wireless power transfer equipment. Illustrative configurations in which wireless power transmitting device 12 is a wireless charging puck having a cable with a connector that is adapted to plug into a device such as a power adapter or other electronic equipment with a USB connector port are sometimes described herein as an example.

Power receiving device 24 may be a portable electronic device such as a wristwatch or other electronic equipment. Power transmitting device 12 may be coupled to a wall outlet (e.g., an alternating current power source) and may use AC-DC converter to produce direct-current (DC) power and/or may have a battery for supplying power. In some embodiments, which are described herein as an example, AC-DC converter 14 is a stand-alone power converter or is incorporated into a laptop computer or other device with a connector port (e.g., a USB connector port). With this type of arrangement, device 12 is separate from the equipment that includes converter 14 and has a cable that plugs into the connector port to receive DC power from converter 14.

The DC power may be used to power control circuitry 16. During operation, a controller in control circuitry 16 uses power transmitting circuitry 52 to transmit wireless power to power receiving circuitry 54 of device 24. Power transmitting circuitry 52 may have switching circuitry (e.g., inverter circuitry 61 formed from switches such as transistors) that is turned on and off based on control signals provided by control circuitry 16 to create AC current signals through one or more wireless power transmitting coils such as wireless power transmitting coils 36. Coils 36 may be arranged in a planar coil array (e.g., in configurations in which device 12 is a wireless charging mat) or may be arranged to form a cluster of coils (e.g., in configurations in which device 12 is a wireless charging puck). In some arrangements, device 12 may have only a single coil. In other arrangements, device 12 may have multiple coils (e.g., two or more coils, four or more coils, six or more coils, 2-6 coils, fewer than 10 coils, etc.). An illustrative configuration for device 12 in which device 12 has four wireless power transmitting coils 36 is described herein as an example.

As the AC currents pass through one or more coils 36, alternating-current electromagnetic (e.g., magnetic) fields (wireless power signals 44) are produced that are received by one or more corresponding receiver coils such as coil(s) 48 in power receiving device 24. Device 24 may have a single coil 48, at least two coils 48, at least three coils 48, at least four coils 48, or other suitable number of coils 48. In an illustrative configuration, which may sometimes be described herein as an example, device 24 has at least two coils. These two (or more) coils overlap a subset (e.g., a pair) of the four coils 36 in device 12 and receive wireless signals from the overlapped coils.

When the alternating-current electromagnetic fields are received by coils 48, corresponding alternating-current currents are induced in coils 48. Rectifier circuitry such as rectifier circuitry 50, which contains rectifying components such as synchronous rectification metal-oxide-semiconductor transistors arranged in a bridge network, converts received AC signals (received alternating-current signals associated with electromagnetic signals 44) from one or more coils 48 into DC voltage signals for powering device 24.

The DC voltage produced by rectifier circuitry 50 (sometime referred to as rectifier output voltage Vrect) can be used in charging a battery such as battery 58 and can be used in powering other components in device 24. For example, device 24 may include input-output devices 56 such as a display, touch sensor, communications circuits, audio components, sensors, light-emitting diode status indicators, other light-emitting and light detecting components, and other components and these components (which form a load for device 24) may be powered by the DC voltages produced by rectifier circuitry 50 (and/or DC voltages produced by battery 58).

Device 12 and/or device 24 may communicate wirelessly using in-band or out-of-band communications. Device 12 may, for example, have wireless transceiver circuitry 40 that wirelessly transmits out-of-band signals to device 24 using an antenna. Wireless transceiver circuitry 40 may be used to wirelessly receive out-of-band signals from device 24 using the antenna. Device 24 may have wireless transceiver circuitry 46 that transmits out-of-band signals to device 12. Receiver circuitry in wireless transceiver 46 may use an antenna to receive out-of-band signals from device 12. In-band transmissions between devices 12 and 24 may be performed using coils 36 and 48. With one illustrative configuration, frequency-shift keying (FSK) is used to convey in-band data from device 12 to device 24 and amplitude-shift keying (ASK) is used to convey in-band data from device 24 to device 12. Power may be conveyed wirelessly from device 12 to device 24 during these FSK and ASK transmissions.

It is desirable for power transmitting device 12 and power receiving device 24 to be able to communicate information such as received power, states of charge, and so forth, to control wireless power transfer. However, the above-described technology need not involve the transmission of personally identifiable information in order to function. Out of an abundance of caution, it is noted that to the extent that any implementation of this charging technology involves the use of personally identifiable information, implementers should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Control circuitry 16 has external object measurement circuitry 41 that may be used to detect external objects adjacent to device 12 (e.g., on the top of a charging mat or, if desired, to detect objects adjacent to the coupling surface of a charging puck). Circuitry 41 can detect foreign objects such as coils, paper clips, and other metallic objects and can detect the presence of wireless power receiving devices 24 (e.g., circuitry 41 can detect the presence of one or more coils 48). During object detection and characterization operations, external object measurement circuitry 41 can be used to make measurements on coils 36 to determine whether any devices 24 are present on device 12.

In an illustrative arrangement, measurement circuitry 41 of control circuitry 16 contains signal generator circuitry (e.g., oscillator circuitry for generating AC probe signals at one or more probe frequencies, a pulse generator that can create impulses so that impulse responses can be measured to gather inductance information, Q-factor information, etc.) and signal detection circuitry (e.g., filters, analog-to-digital converters, impulse response measurement circuits, etc.). During measurement operations, switching circuitry in device 12 (e.g., in the puck of device 12) may be adjusted by control circuitry 16 to switch each of coils 36 into use. As each coil 36 is selectively switched into use, control circuitry 16 uses the signal generator circuitry of signal measurement circuitry 41 to apply a probe signal to that coil while using the signal detection circuitry of signal measurement circuitry 41 to measure a corresponding response. Measurement circuitry 43 in control circuitry 30 and/or in control circuitry 16 may also be used in making current and voltage measurements (e.g., so that this information can be used by device 24 and/or device 12).

Figure 2:
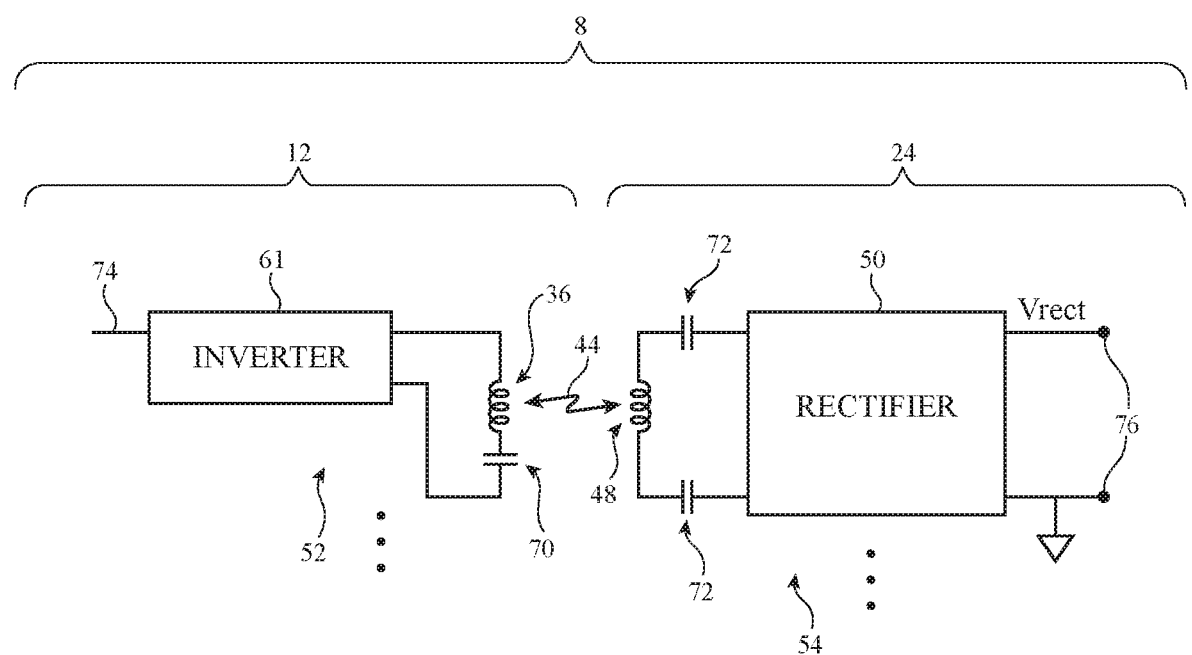
FIG. 2 is a circuit diagram of wireless power transmitting and receiving circuitry in accordance with an embodiment.

FIG. 2 is a circuit diagram of illustrative wireless charging circuitry for system 8. As shown in FIG. 2, circuitry 52 may include inverter circuitry such as one or more inverters 61 or other drive circuitry that produces wireless power signals that are transmitted through an output circuit that includes one or more coils 36 and capacitors such as capacitor 70. In some embodiments, device 12 may include multiple individually controlled inverters 61, each of which supplies drive signals to a respective coil 36. In other embodiments, an inverter 61 is shared between multiple coils 36 using switching circuitry.

During operation, control signals for inverter(s) 61 are provided by control circuitry 16 at control input 74. A single inverter 61 and single coil 36 is shown in the example of FIG. 2, but multiple inverters 61 and multiple coils 36 may be used, if desired. In a multiple coil configuration, switching circuitry (e.g., multiplexer circuitry) can be used to couple a single inverter 61 to multiple coils 36 and/or each coil 36 may be coupled to a respective inverter 61. During wireless power transmission operations, transistors in one or more selected inverters 61 are driven by AC control signals from control circuitry 16. The relative phase between the inverters can be adjusted dynamically (e.g., a pair of inverters 61 may produce output signals in phase or out of phase (e.g., 180° out of phase).

The application of drive signals using inverter(s) 61 (e.g., transistors or other switches in circuitry 52) causes the output circuits formed from selected coils 36 and capacitors 70 to produce alternating-current electromagnetic fields (signals 44) that are received by wireless power receiving circuitry 54 using a wireless power receiving circuit formed from one or more coils 48 and one or more capacitors 72 in device 24.

If desired, the relative phase between driven coils 36 (e.g., the phase of one of coils 36 that is being driven relative to another adjacent one of coils 36 that is being driven) may be adjusted by control circuitry 16 to help enhance wireless power transfer between device 12 and device 24. Rectifier circuitry 50 is coupled to one or more coils 48 (e.g., a pair of coils) and converts received power from AC to DC and supplies a corresponding direct current output voltage Vrect across rectifier output terminals 76 for powering load circuitry in device 24 (e.g., for charging battery 58, for powering a display and/or other input-output devices 56, and/or for powering other components). A single coil 48 or multiple coils 48 may be included in device 24. In an illustrative configuration, device 24 may be a wristwatch or other portable device with at least two coils 48. These two (or more) coils 48 may be used together when receiving wireless power. Other configurations may be used, if desired.

Figure 3:
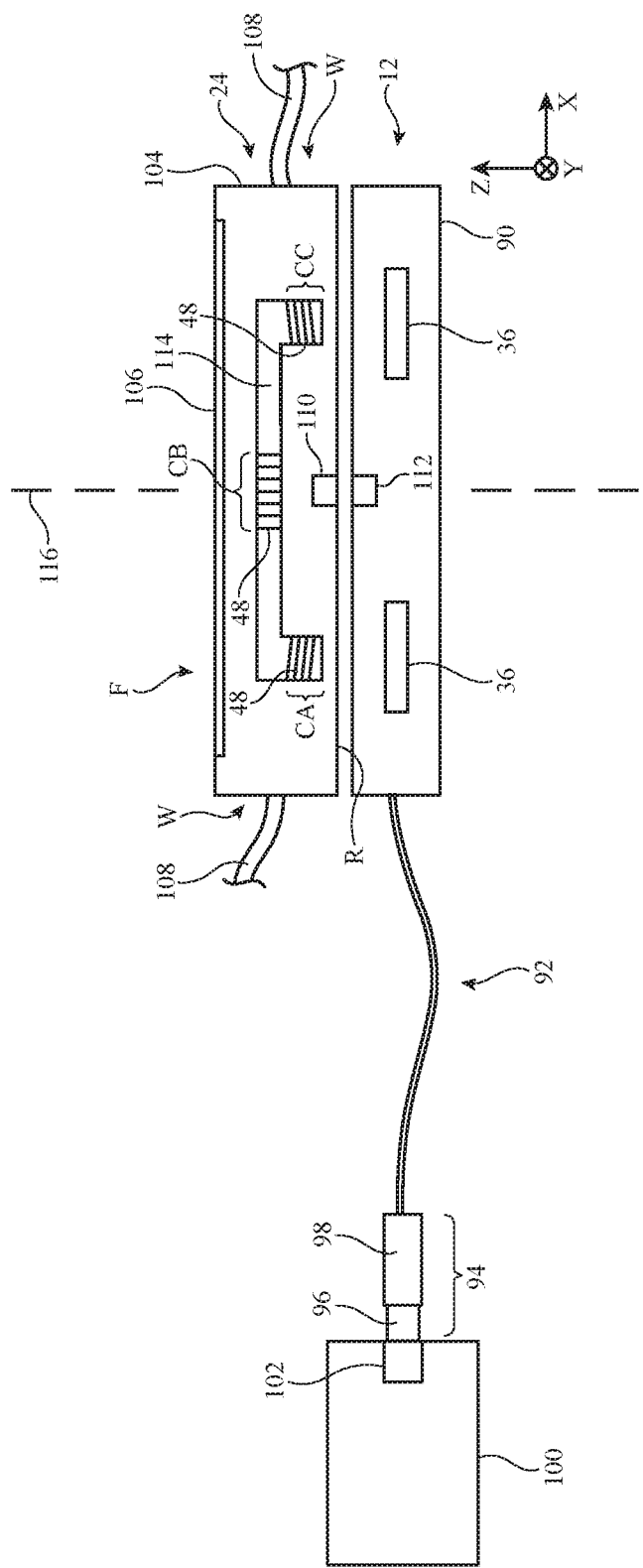
FIG. 3 is a side view of an illustrative wireless power transmitting device such as a wireless charging puck and a corresponding wireless power receiving device such as a wrist watch with multiple wireless power receiving coils in accordance with an embodiment.

FIG. 3 is a cross-sectional side view of system 8 in an illustrative configuration in which wireless power transmitting device 12 is a wireless charging puck and in which wireless power receiving device 24 is a wristwatch (as an example). As shown in FIG. 3, device 12 has housing 90 (e.g., a disk-shaped puck housing formed form polymer, other dielectric material, and/or other materials). Cable 92 is coupled to housing 90 and provides power to coils 36. Cable 92 may be, for example, a three-wire cable. One end of cable 92 may be pigtailed to housing 90. The opposing end of cable 92 is terminated using connector 94. Connector 94 has contacts (pins) 96 supported by connector housing 98.

Connector housing 98, which may sometimes be referred to as a boot or connector boot, may be formed from polymer, metal, and/or other materials and may have an interior region configured to house electrical components (e.g., integrated circuits, discrete components such as transistors, printed circuits, etc.). Contacts 96 are configured to mate with corresponding pins in port 102 of external equipment such as device 100. Device 100 may be a stand-alone power adapter, an electronic device such as a computer, or other equipment that provides DC power to connector 94 through port 102. Port 102 may be, for example, a USB port.

Device 24 has a housing such as housing 104. Housing 104 and device 24 have opposing front and rear faces such as front face F and rear face R. Housing 104 also has sidewall portions W. Wrist band 108 is coupled to sidewall portions W. Display 106 is formed on front face F of housing 104 and device 24 and lies in a plane that is perpendicular to the Z axis (e.g., a plane such as the X-Y plane of FIG. 3 that is parallel to the planes including front face F and rear face R of housing 104). Device 24 and device 12 may have magnets (and/or magnetic material such as iron). For example, device 24 may have magnet 110 and device 12 may have mating magnet 112. Magnets 110 and 112 attract each other and thereby hold devices 12 and 24 together during charging. In some embodiments, magnets 110 and 112 are located along central axis 116, so that device 24 has the potential to rotate relative to device 12 about axis 116.

The coils in devices 12 and/or 24 may have any suitable number of turns of wire (e.g., at least 2 turns, at least 10 turns, at least 30 turns, fewer than 200 turns, fewer than 100 turns, etc.). As shown in FIG. 3, coils 36 may be mounted in housing 90 of device 12 and coils 48 may be mounted in housing 104 of device 24. In some configurations, the coils may be formed from turns of wire wrapped around cores made of iron, ferrite, or other magnetic material.

In the embodiment of FIG. 3, device 24 has coils 48 such as coils CA, CB, and CC. Two or more of coils 48 may be wound on a common magnetic core such as magnetic core 114. Core 114 may have a horseshoe shape with vertical pillars for coils CA and CC and/or may have other suitable shapes. During operation, one, two, or three of coils CA, CB, and CC are used to receive wireless power that is being transmitted by wireless power transmitting coils 36. Coils 36 are arranged in an array of four coils 36 surrounding central axis 116 or other suitable pattern. Depending on the relative rotational orientation of devices 24 and 12 about axis 116, different subsets of coils 36 are used in transmitting wireless power. For example, in a first orientation, a first pair of the four coils 36 in device 12 can be used and in a second orientation, a second pair of the four coils 36 in device 12 can be used. The relative phase of the drive signals applied to the coils 36 in the selected pair can also be adjusted to ensure satisfactory power transfer to coils 48 (e.g., the relative phase of the drive signals applied to a pair of selected transmitting coils 36 can be adjusted so that the drive signals are in phase or 180° out of phase with respect to each other).

When device 12 is first coupled to device 24, device 12 may perform measurements using measurement circuitry 41. For example, control circuitry 16 may use impulse response measurement circuitry in measurement circuitry 41 to determine which of coils 36 is overlapped by coils 48 such as coils CA and CC at opposing ends of core 114. In response to determining that a first of coils 36 is overlapped by coil CA and that a second of coils 36 is overlapped by coil CC, device 12 can use the first and second of coils 36 in transmitting wireless power to device 24.

Figure 4:
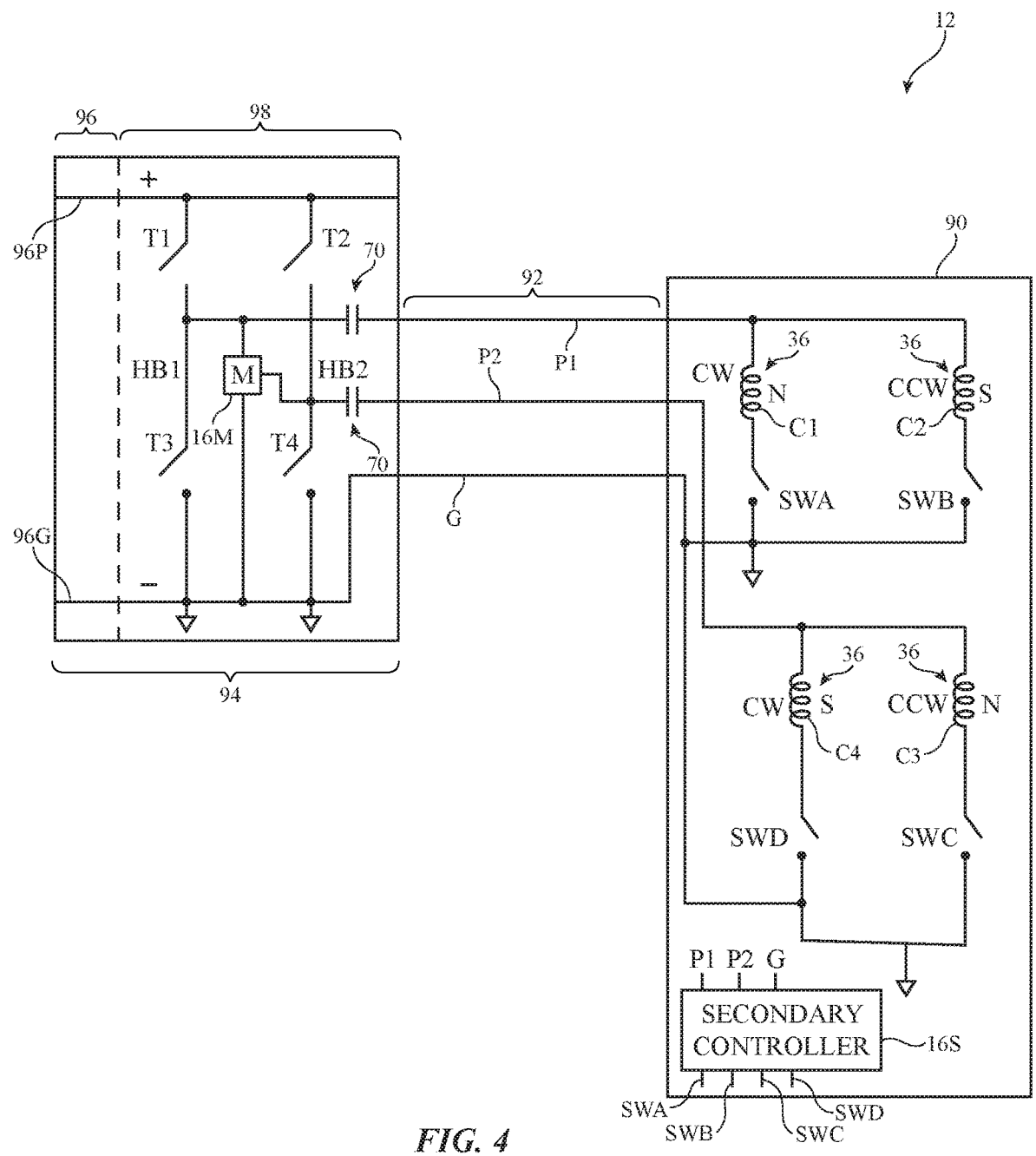
FIG. 4 is a circuit diagram of illustrative wireless power transmitting device circuitry for a wireless charging puck in accordance with an embodiment.

A diagram of device 12 showing illustrative circuitry that may be used to select desired coils 36 for transmitting wireless power to device 24 is shown in FIG. 4.

As shown in FIG. 4, device 12 has a connector such as connector 24 that is coupled to puck housing 90 by three-wire cable 92. Connector 24 may be, for example, a Universal Serial Bus (USB) connector. Connector 24 has contacts 96 such as positive contact 96P and ground contact 96G (and/or other contacts) and is plugged into a power port in external electronic equipment to receive direct-current (DC) power (e.g., a DC voltage) across contacts 96P and 96G. Cable 92 conveys power and control signals from connector 94 to the circuitry in puck housing 92.

Control circuitry 16 (FIG. 1) may include a first control circuitry portion such as main controller 16M and a second control circuitry portion such as secondary controller 16S. Switches T1, T2, T3, T4, SWA, SWB, SWC, and SWD, which may sometimes be referred to as forming part of control circuitry 16, may be controlled by control signals that are asserted and deasserted by main controller 16M and/or by secondary controller 16S. Main controller 16M is formed in connector housing 98. Secondary controller 16S is formed in puck housing 90. During operation, main controller 16M may transmit control signals to secondary controller 16S over signal paths (e.g., signal paths P1 and P2 and ground path G) in cable 92.

Switching circuitry such as switches T1, T2, T3, and T4 (e.g., transistors having gates that receive control signals from control circuitry such as main controller 16M) may form inverter circuitry 61 (FIG. 2) and may be controlled (e.g., turned on and off repeatedly) to produce alternating-current drive signals for coils 36 from the direct-current (DC) voltage supplied across contacts 96P and 96G. The alternating-current drive signals are provided to coils 36 through capacitors 70 and cable 92. Coils 36 can be formed in an array in puck housing 90. As an example, coils 36 may be arranged in a circle so that all four of coils 36 are able to transmit and/or receive magnetic fields through the upper surface of housing 90.

Secondary controller 16S can be coupled to signal paths P1, P2, and G of cable 92. During operation, main controller 16M and secondary controller 16S may transmit and/or receive signals using any suitable communications scheme (e.g., using bidirectional communications or unidirectional communications). Digital data (e.g., isolated control bits, packets of digital data, etc.) may be transmitted. The digital data may be encoded using tone encoding and/or other suitable encoding techniques.

As an example, main controller 16M may send instructions to secondary controller 16S to direct secondary controller 16S to activate selected switches SWA, SWB, SWC, and SWD (e.g., a subset of these switches such as a pair of these switches) and thereby activate selected coils 36 (e.g., a pair of coils 36) for use in transmitting wireless signals to device 24. In response, secondary controller 16S may issue local control signals (e.g., controller 16S may assert and/or deassert control signals on transistor gates or other control terminals associated with switching circuitry in puck housing 90 such as switches SWA, SWB, SWC, and SWD).

When switch SWA is open, a first of coils 36 (coil C1) is switched out of use. When switch SWA is closed, coil C1 is switched into use and can transmit wireless signals in response to the AC drive signals received using signal paths P1 and G. When switch SWB is open, a second of coils 36 (coil C2) is switched out of use. When switch SWB is closed, coil C2 is switched into use and can transmit wireless signals in response to the AC drive signals received using signal paths P1 and G. When switch SWC is open, a third of coils 36 (coil C3) is switched out of use. When switch SWC is closed, coil C3 is switched into use and can transmit wireless signals in response to the AC drive signals received using signal paths P2 and G. When switch SWD is open, a fourth of coils 36 (coil C4) is switched out of use. When switch SWD is closed, coil C4 is switched into use and can transmit wireless signals in response to the AC drive signals received using signal paths P2 and G. Coils 36 can have any suitable winding senses (clockwise, counterclockwise). In the example of FIG. 4, coil C1 is wound clockwise (CW), coil C2 is wound counterclockwise (CCW), coil C3 is wound counterclockwise (CCW), and coil C4 is wound clockwise (CW).

Figure 5:
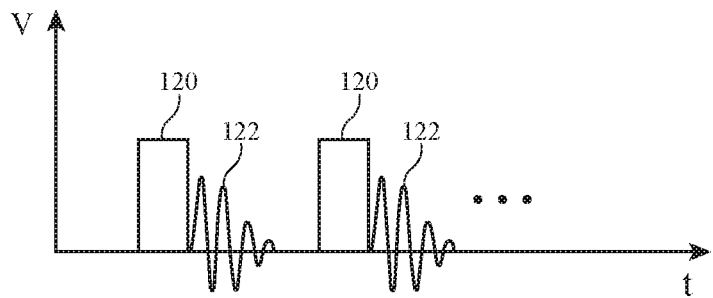
FIG. 5 is a graph showing signals associated with transmitting measurement impulses and measuring impulse responses in accordance with an embodiment.

During initial operation, control circuitry 16 uses measurement circuitry 41 (e.g., impulse response measurement circuitry) to drive impulses (see, e.g., square waves 120 of FIG. 5) onto coils 36 while measuring and analyzing corresponding impulse responses in coils 36 (e.g., to analyze the frequency, decay envelope, and other properties of impulse response signals 122 in coils 36). Using these measurements, control circuitry 16 can determine which of the four coils 36 are magnetically coupled to coils 48 in device 24 (e.g., so that device 12 can determine which coils 36 are overlapped by coils CA and CC and should therefore be used in transmitting wireless power signals). Impulses 120 may be pulses with any suitable duration. For example, impulses 120 may have durations less than 10 ms, less than 1 ms, less than 100 microseconds, less than 10 microseconds, less than 1 microsecond, more than 1 microsecond, more than 5 microseconds, more than 25 microseconds, etc.

Figure 6:
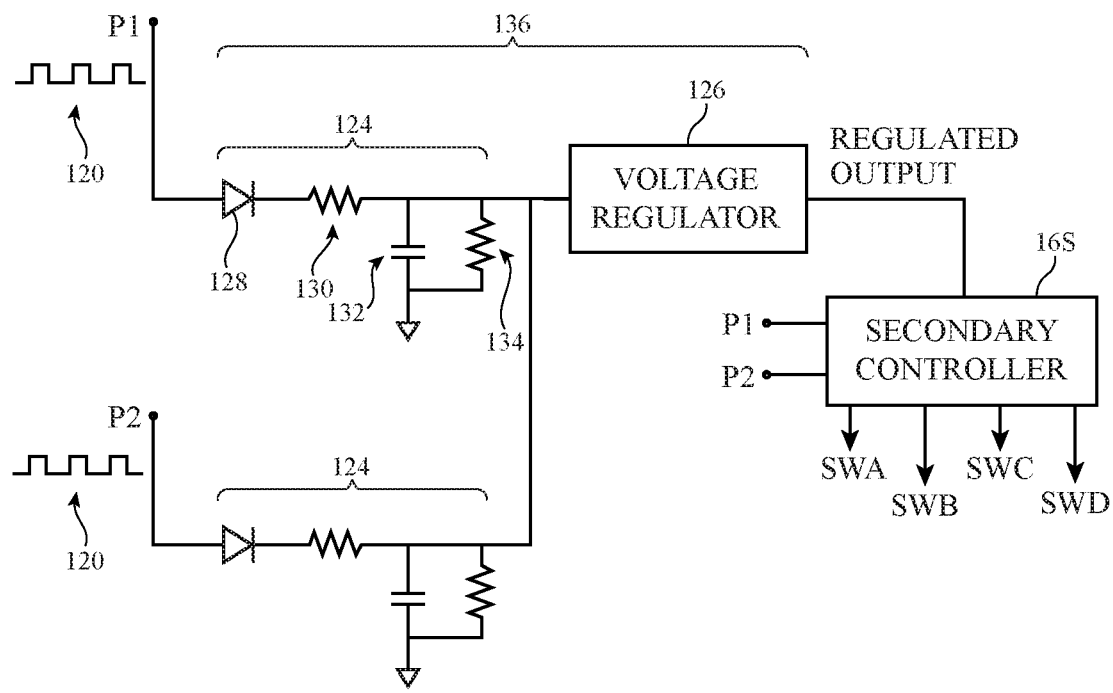
FIG. 6 is a diagram of power harvesting circuitry for the puck portion of the wireless power transmitting device in accordance with an embodiment.

The process of sending AC measurement signals such as impulses 120 over cable 92 from connector 94 supplies power to puck 90. This power may be harvested by power harvesting circuitry in puck 90 such as illustrative power harvesting circuitry 136 of FIG. 6. As shown in FIG. 6, power harvesting circuitry 136 of FIG. 6 includes peak detector circuits 124 that receive impulses 120 on lines P1 and P2, respectively. Each peak detector circuit 124 has a diode 128, resistors 130 and 134, and a capacitor 132. During each impulse 120, diode 128 turns on and capacitor 132 charges, which creates a voltage at the input of voltage regulator 126. Resistor 130 forms an RC filter with capacitor 132. Resistor 134 helps the voltage at the input of voltage regulator 126 return to ground potential when voltage regulator 126 is off.

The output of peak detector circuits 124 is converted to a desired DC voltage using voltage regulator 126 and used to power secondary controller 16S. In this way, secondary controller 16S can be powered by harvesting power from impulses (pings) 120 and can operate (e.g., to open and close desired switches among switches SWA, SWB, SWC, and SWD) without incorporating additional (e.g., separate) power supply paths in cable 92. This helps reduce the size of cable 92.

Any suitable communications protocol(s) may be used to support communications between main controller 16M and secondary controller 16S. With an illustrative configuration, secondary controller 16S monitors signal paths P1 and P2 for incoming signals from main controller 16M. When main controller 16M desires to send commands to secondary controller 168, main controller 16M controls the states of switches (transistors) T1, T2, T3, and T4. Switches T1, T2, T3, and T4 are configured to form a full-bridge driver circuitry that includes half-bridge driver circuitry HB1 (switches T1 and T2) and half-bridge driver circuitry HB2 (switches T3 and T4). When main controller 16M desires to direct secondary controller 16S to close switch SWA, main controller 16M may, as an example, use half-bridge driver circuitry HB1 to supply a 100 kHz tone to path P1. A different tone (e.g., a 150 kHz tone) may be supplied on path P1 when main controller 16M desires to direct secondary controller 16S to close switch SWB. Switch SWC may be closed by using main controller 16M to send a 100 kHz tone to secondary controller 16S on path P2. Switch SWD may be closed by sending a 150 kHz tone to secondary controller 16S on path P2.

As this example demonstrates, communications between controllers 16M and 16S may involve path-based and tone-based encoding. Other encoding schemes may be used if desired. For example, information may be conveyed by adjusting the duty cycle of pulses 120 (e.g., duty-cycle encoding may be used to inform controller 16S of which switches to close by, for example, sending pulses 120 with a 10% duty cycle to instruct controller 16S to control one switch and sending pulses 120 with a 20% duty cycle to instruct controller 16S to close a different switch, etc.). If desired, tone-based encoding schemes may use tones of different frequencies than 100 kHz and 150 kHz, non-tone signaling schemes may be used (e.g., DC-encoded voltages may be conveyed over cable 92 by, e.g., using a 5 V to direct controller 16S to close one switch and using a 6 V to direct controller 16S to close a different switch), and/or other suitable communications schemes may be used. Communications may be unidirectional (controller 16M sends instructions such as switch configuration instructions to controller 16S) and/or bidirectional (e.g., to allow controller 16S to handshake and/or send information to controller 16M).

When it is desired to transmit power wirelessly from device 12 to device 24, housing 104 is coupled to housing 90 using magnets 110 and 112. This places device 24 and housing 104 in a particular rotational orientation about axis 116 with respect to device 12 and housing 90. As a result, core 114 and coils CA and CC will be oriented in a particular rotational orientation about axis 116 with respect to transmitting coils 36. For example, coils CA and CC may overlap coils C1 and C2 while not overlapping coils C3 and C4. Once housings 104 and 90 are coupled to each other, controller 16M can detect which coils 36 are overlapped by coils CA and CC using impulse response measurements. After determining (in this example) that coils C1 and C2 in puck housing 90 are being overlapped and should therefore be used in transmitting wireless power to device 24, controller 16M sends control signals to secondary controller 168 that direct controller 168 to close switches SWA and SWB while opening switches SWC and SWD. This inactivates unused coils C3 and C4 and activates coils C1 and C2 so that wireless power is transmitted to coils CA and CC by coils C1 and C2.

The relative phase of the drive signals for coils C1 and C2 is determined by the winding sense for coils C1, C2, CA, and CC. For example, coil C1 can be configured to create a "north" magnetic field while coil C2 creates a "south" magnetic field, which allows magnetic field to travel from coil C1 to overlapping coil CA, through core 114 (and past optional coil CB, which can be used to help extract power from the transmitted signal), then out through coil CC into coil C2. If the winding senses of the selected subset of coils 36 to be used for power transmission are not as desired (e.g., if a coil has a clockwise winding sense when a counterclockwise sense is desired), controller 16M can adjust the phase of the control signals applied to switches T1, T2, T3, and T4 in half-bridge driver circuitry HB1 and/or HB2 (e.g., to flip the relative phase of the AC drive signal supplied to a first active coil by 180° or other suitable amount with respect to another active coil).

FIGS. 7, 8, 9, 10, 11, and 12 show six possible relative orientations between coils CA and CB in device 24 (coils 48) and underlying coils C1, C2, C3, and C4 (coils 36) in device 12.

Figure 7:
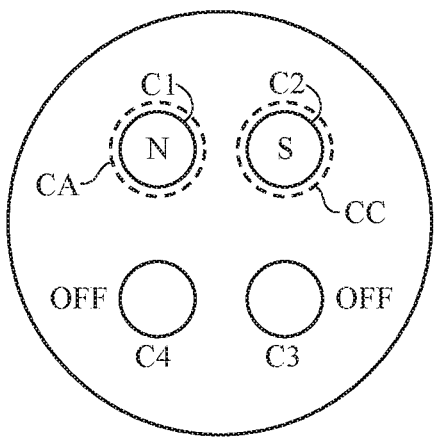
FIGS. 7, 8, 9, 10, 11, and 12 are diagrams showing six illustrative coil overlap scenarios and wireless power transmitting arrangements in a wireless charging puck having an array of four wireless power transmitting coils in accordance with an embodiment.

In the example of FIG. 7, coil CA overlaps coil C1 and coil CC overlaps coil C2. Coils C1 and C2 are therefore activated by closing switches SWA and SWB and coils C3 and C4 are switched off by opening switches SWC and SWD. In the present example, the winding senses of coils C1 and C2 are opposite so that coil C1 produces magnetic field with a first orientation (e.g., north N) while coil C2 produces magnetic field with an opposite second orientation (e.g., south S), which is appropriate (in this example) for supplying power to coils CA and CC (and, if desired, CB) on core 114). Accordingly, the AC drive circuitry of device 12 in connector 94 may be used to drive coils C1 and C2 in phase while transmitting wireless power from coils C1 and C2 to coils CA and CC.

Figure 8:
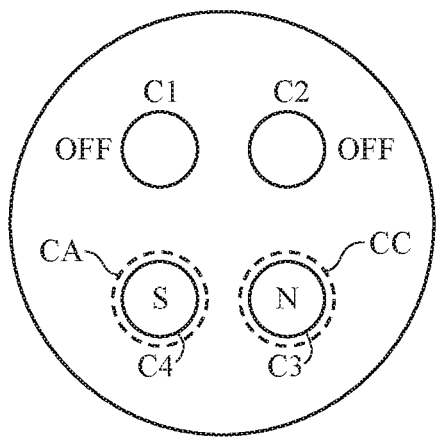

In the example of FIG. 8, coils C3 and C4 may be activated and driven in phase to transmit power to overlapping coils CA and CC, whereas coils C1 and C2 may be turned off.

Figure 9:
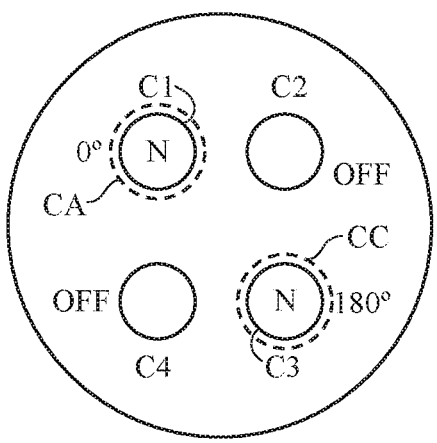

In the example of FIG. 9, the winding sense of coils C1 and C3 are such that coil C1 and coil C3 produce magnetic fields of the same orientation unless driven out of phase. Accordingly to couple effectively with overlapping coils CA and CC, coils C1 and C3 can be supplied with AC drive signals that are 180° out of phase. Coils C2 and C4 can be switched out of use by directing secondary controller 16S to place switches SWB and SWD in their open states.

Figure 10:
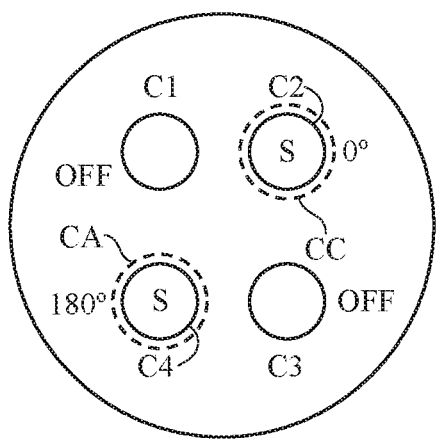

In the example of FIG. 10, 180° out-of-phase drive signals are applied to coils C2 and C4 to supply wireless power to overlapping coils CA and CC. Coils C1 and C3 are not overlapped by coils in device 24 and are therefore switched out of use.

Figure 11:
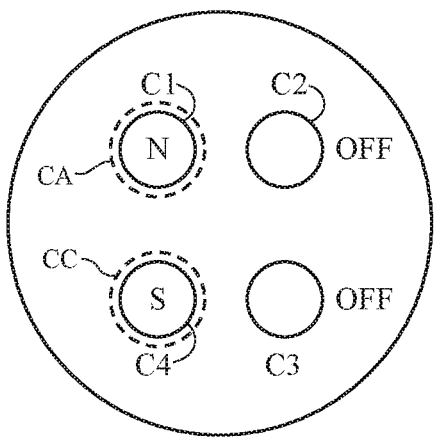

In the example of FIG. 11, coil CA overlaps coil C1 and coil CC overlaps coil C4. Accordingly, coils C1 and C4 are switched into use and coils C2 and C3 are switched out of use. Coils C1 and C4 are driven in phase (in this example).

Figure 12:
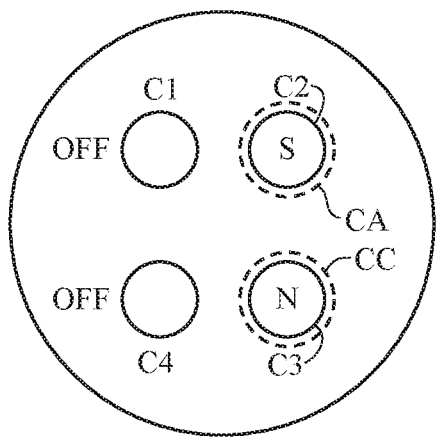

In the example of FIG. 12, coil CA overlaps coil C2 and coil CC overlaps coil C3. Coils C2 and C3 can therefore be switched into use and coils C1 and C4 can be switched out of use. Coils C2 and C3 can be driven in phase during wireless power transmission.

Figure 13:
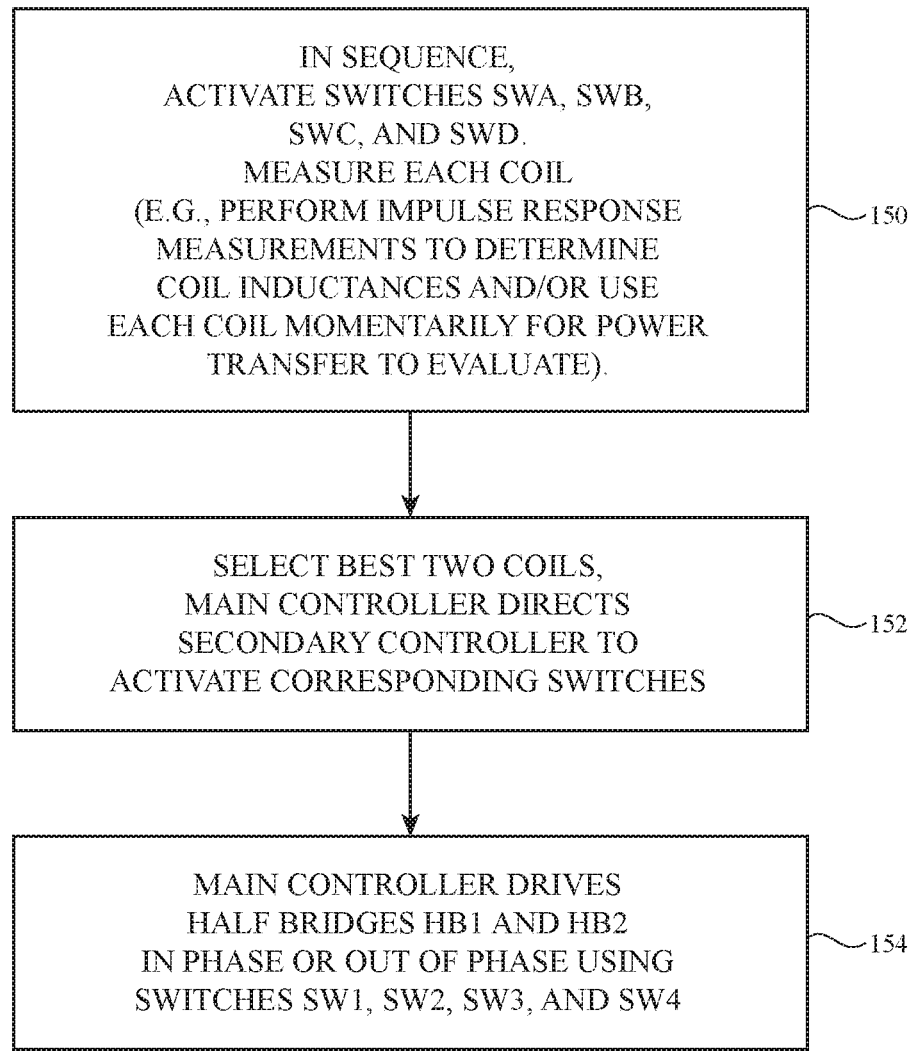
FIG. 13 is a flow chart of illustrative operations associated with using a wireless power transmitting device to transmit power to a wireless power receiving device in accordance with an embodiment.

Illustrative operations involved in using wireless power transmitting device 12 to transmit wireless power to wireless power receiving device 24 are shown in FIG. 13.

During the operations of block 150, control circuitry 16 activates each of coils 36 in turn and uses the activated coil to measure whether one of coils 48 is overlapping that coil 36 and is therefore ready to receive wireless power. With an illustrative configuration, main controller 16M, which is used in controlling switches T1, T2, T3, and T4, sends impulses 120 over cable 92 while directing secondary controller 16S to switch on each of coils 36 in sequence (while turning off all remaining coils 36). The impulse responses produced by applying impulses 120 can be evaluated by controller 16M to determine the inductance of each of coils 36 and thereby determine which of coils 36 are overlapped by coils 48 (e.g., coil CA or coil CC and the associated portions of magnetic material in core 114 on which the coils are wound). Power harvested from the impulses is used in powering secondary controller 16S. If desired, in addition to or instead of using impulse response measurements to evaluate overlap and magnetic coupling between coils 48 and coils 36, overlap and coupling can be evaluated by using each coil 36 to momentarily transmit wireless power signals and observing the results of these power transfer operations between device 12 and device 24 (e.g., using measurement circuitry 41 and/or 43, etc.).

After using impulse response measurements or other measurements indicative of magnetic coupling between each of wireless power transmitting coils 36 and each of wireless power receiving coils 48, control circuitry 16 (e.g., main controller 16M) may, during the operations of block 152, select a subset of transmitting coils to be used such as the best two coils 36 (e.g., the two coils 36 with the highest coupling to coils 48 or the two coils 36 that satisfy other predetermined coil selection criteria). Main controller 16M can then send control signals to secondary controller 16S that direct secondary controller 16S to activate corresponding switches in puck housing 90 to activate these two coils 36. For example, in the scenario of FIG. 7, coils C1 and C2 are turned on and this setting is locked into place by secondary controller 16S in the absence of additional commands from main controller 16M.

During the operations of block 154, main controller 16 uses appropriate switches in connector 94 (see, e.g., switches T1, T2, T3, and T4) to supply AC drive signals of appropriate phase (e.g., in phase or 180° out of phase) to the coils activated during the operations of block 152. Main controller 16M may, as an example, operate half-bridge circuitry HB1 and/or half-bridge circuitry HB2 in or out of phase, as appropriate.

The foregoing is merely illustrative and various modifications can be made to the described embodiments. The foregoing embodiments may be implemented individually or in any combination.

What is claimed is:

1. A wireless power transmitting device configured to wirelessly transmit power to a wireless power receiving device, comprising:
   a housing having one or more wireless power transmitting coils;
   a connector having contacts configured to receive direct-current power from an external power port;
   a cable connected between the connector and the housing that does not carry direct-current signals; and
   control circuitry in the connector that is configured to provide alternating-current signals to the one or more wireless power transmitting coils through the cable that cause the one or more wireless power transmitting coils to transmit wireless power signals to the wireless power receiving device.

2. The wireless power transmitting device of claim 1 wherein the cable has no more than a first number of wires, wherein the housing has no more than a second number of the one or more wireless power transmitting coils, and wherein the first number is less than the second number.

3. The wireless power transmitting device of claim 1 further comprising power harvesting circuitry in the housing that is coupled to the cable and that produces direct-current power.

4. The wireless power transmitting device of claim 3 wherein the wireless power transmitting device comprises switching circuitry in the housing and comprises control circuitry in the housing that controls the switching circuitry using the direct-current power.

5. The wireless power transmitting device of claim 4, wherein the one or more wireless power transmitting coils comprises at least two wireless power transmitting coils and wherein the switching circuitry comprises:

switches that are respectively coupled to each of the at least two wireless power transmitting coils, wherein the control circuitry in the housing is configured to activate a selected subset of the switches to switch a corresponding subset of the at least two wireless power transmitting coils into use in transmitting the wireless power signals to the wireless power receiving device.

6. The wireless power transmitting device of claim 5 wherein the control circuitry in the connector is configured to transmit commands to the control circuitry in the housing.

7. The wireless power transmitting device of claim 4 wherein the control circuitry in the connector includes impulse measurement circuitry configured to supply impulses to the one or more wireless power transmitting coils and wherein the power harvesting circuitry receives the impulses and produces the direct-current power from the impulses.

8. The wireless power transmitting device of claim 1 wherein the one or more wireless power transmitting coils include a first wireless power transmitting coil, a second wireless power transmitting coil, a third wireless power transmitting coil, and a fourth wireless power transmitting coil and wherein the wireless power transmitting device comprises switches in the housing that include a first switch coupled to the first wireless power transmitting coil, a second switch coupled to the second wireless power transmitting coil, a third switch coupled to the third wireless power transmitting coil, and a fourth switch coupled to the fourth wireless power transmitting coil.

9. The wireless power transmitting device of claim 1 wherein the housing comprises a puck housing, the wireless power transmitting device further comprising a magnet in the puck housing that is configured to attract a corresponding magnet in the wireless power receiving device.

10. The wireless power transmitting device of claim 1 wherein the one or more wireless power transmitting coils comprises at least two wireless power transmitting coils, the wireless power transmitting device further comprising four switches in the connector that form first and second half-bridge driver circuits configured to drive alternating-current signals to a subset of the at least two wireless power transmitting coils.

11. The wireless power transmitting device of claim 10 wherein the control circuitry in the connector is configured to control the first and second half-bridge driver circuits to adjust a relative phase between 1) an alternating-current signal supplied to a first wireless power transmitting coil in the subset of the at least two wireless power transmitting coils and 2) an alternating-current signal supplied to a second wireless power transmitting coil in the subset of the at least two wireless power transmitting coils.

12. A wireless power transmitting device configured to wirelessly transmit power to a wireless power receiving device, comprising:

a housing having no more than a first number of wireless power transmitting coils configured to transmit wireless power signals to the wireless power receiving device;

a connector having contacts configured to receive direct-current power from an external power port; and a cable connected between the connector and the housing that has no more than a second number of wires, wherein the second number is less than the first number and wherein the cable is configured to carry alternating-current signals.

13. The wireless power transmitting device of claim 12 further comprising:

power harvesting circuitry in the housing.

14. The wireless power transmitting device of claim 13 wherein the power harvesting circuitry is configured to receive the alternating-current signals over the cable and provide corresponding direct-current power.

15. The wireless power transmitting device of claim 14 further comprising control circuitry in the housing that receives the direct-current power.

16. The wireless power transmitting device of claim 15 further comprising:

control circuitry in the connector that sends tone-encoded information to the control circuitry in the housing; and switches in the housing that are controlled by the control circuitry in the housing based on the tone-encoded information.

17. The wireless power transmitting device of claim 12 further comprising control circuitry in the connector configured to control switching circuitry in the housing to switch a selected subset of the wireless power transmitting coils into use to transmit the wireless power signals.

18. A wireless power transmitting device, comprising:

a connector having contacts configured to mate with corresponding contacts in a port;

a housing having a magnet configured to mate with a magnet in a wireless power receiving device;

wireless power transmitting coils in the housing;

a cable with wires, wherein the cable has a first end coupled to the connector and a second end coupled to the housing;

power harvesting circuitry in the housing that receives impulses from the connector over the wires and that supplies corresponding direct-current power; and control and switching circuitry in the housing that is powered by the direct-current power and that uses a subset of the wireless power transmitting coils to transmit wireless power signals.

19. The wireless power transmitting device of claim 18 wherein the connector comprises a Universal Serial Bus connector.

\* \* \* \* \*